United States Patent [19]
Rivin

[11] Patent Number: 5,630,758
[45] Date of Patent: May 20, 1997

[54] TORSIONAL CONNECTION WITH RADIALLY SPACED MULTIPLE FLEXIBLE ELEMENTS

[76] Inventor: Evgeny I. Rivin, 30236 Southfield Rd., #249, Southfield, Mich. 48076

[21] Appl. No.: 176,246

[22] Filed: Jan. 3, 1994

[51] Int. Cl.[6] .................................................. F16D 3/64
[52] U.S. Cl. ........................ 464/74; 464/76; 464/83
[58] Field of Search ............................ 464/73, 74, 83, 464/82, 85, 81, 76

[56] References Cited

U.S. PATENT DOCUMENTS

| | | | |
|---|---|---|---|
| 3,386,265 | 6/1968 | Kasaback | 464/82 X |
| 3,517,754 | 6/1970 | Hughes | 464/74 X |
| 3,837,179 | 9/1974 | Barth | 464/76 |
| 4,477,225 | 10/1984 | Burkam | 464/74 X |
| 4,560,367 | 12/1985 | Wolf et al. | 464/83 |

FOREIGN PATENT DOCUMENTS

| | | | |
|---|---|---|---|
| 404004323 | 8/1992 | Japan | 464/74 |
| 405157119 | 6/1993 | Japan | 464/74 |
| 1590737 | 9/1990 | U.S.S.R. | 464/74 |
| 258061 | 9/1926 | United Kingdom . | |

*Primary Examiner*—Daniel P. Stodola
*Assistant Examiner*—Eileen A. Dunn
*Attorney, Agent, or Firm*—Gifford, Krass, Groh, Sprinkle, Patmore, Anderson & Citkowski, P.C.

[57] ABSTRACT

The torsional flexible connection has two coaxial flanges or discs equipped with sets of equidistant radially or axially protruding blades which are interdigitated to form a plurality of wedge-shaped chambers whose sides intersect at the axis of the connection, all or some of which receive torque-transmitting flexible inserts which transmit force and rotation to one of the flanges/discs in response to the force and rotation transmitted from the other flange/disc or vice versa. Each insert is comprised of two or several elements of a streamlined shape placed at different distances from the axis, so that the dimensions of these elements in the direction of transmitted payload are proportional to their distances from the axis.

12 Claims, 3 Drawing Sheets

TORSIONAL CONNECTION WITH RADIALLY SPACED MULTIPLE FLEXIBLE ELEMENTS

FIELD OF THE INVENTION

The present invention relates to flexible torsional connections for mechanical power transmission.

BACKGROUND OF THE INVENTION

Conventional torsional flexible connections consist of two hubs between which a flexible (deformable) member is located. The flexible member can be continuous, and loaded in shear such as in tire couplings, or can be composed of several discrete elements loaded in compression (e.g., see E. Rivin, "Design and Application Criteria for Connections Couplings", in ASME Journal of Mechanisms, Transmissions and Automation in Design, 1986, Vol. 108, No. 1, pp. 96–105). Usually the former types of flexible torsional connections (with shear deformation of the deformable member) have a relatively high torsional flexibility, but a relatively low payload capacity for a given size. The latter types (with compression deformation of the deformable member) have a relatively high payload capacity for a given size, but a relatively low flexibility (high torsional stiffness), as it is also demonstrated in the above-referenced article. Some torsional flexible connections exhibit non-linear load-deflection (torque-angular deformation) characteristic which is beneficial for many applications as it is demonstrated in the above-referenced article. However, non-linear torsional flexible connections known in the art (e.g., MAX C "CB" from Kop-Flex Company) have a relatively low payload capacity for a given size.

Flexible torsional connections of the above outlined types are normally used as flexible couplings for connecting nominally coaxial shafts. Numerous flexible coupling designs are known which can transmit substantial torques while having reasonably small dimensions, but at the price of low torsional compliance, e.g. so-called jaw couplings represented by teachings of U.S. Pat. No. 3,638,454 in which rubber flexible inserts conform with the chambers into which they are inserted thus restricting deformation of the inserts under the transmitted torque, but allowing to accommodate high forces and, consequently, torques. Other designs have extended torsional flexibility (required in many applications for reducing transient overloads and torsional vibrations), but at the price of a reduced rating, i.e. of reduced torque-transmitting capability for a given size, thus requiring large and costly installations. A representative of this group is Dynaflex family of couplings from Lord Corporation in which an annular rubber elastic element is undergoing shear deformation.

Large size for a given rated torque prevents designers from using conventional flexible couplings as flexible hub-to-rim connections in such power-transmission elements as gears, sprockets, pulleys/sheaves which frequently require such connections for reducing dynamic loads in the mesh (and, consequently, for increasing rated payload capacity of the gears), for reducing or modifying torsional vibrations in the transmissions, and for reducing noise. Another factor preventing use of conventional flexible couplings for hub-to-rim connections is their inevitable radial compliance unacceptable for gear/sprocket applications. Attempts to reduce radial compliance (i.e., increase radial stiffness) by changing characteristics of a conventional connection lead to undesirable increase in its torsional rigidity (e.g., see the above referenced article).

In short, none of the prior art patents or trade publications serve to satisfy a need for a reasonably compact torsional flexible connection which can transmit high payloads, has high torsional flexibility, has non-linear torque-angular deformation characteristic, and can be used both as a torsionally flexible coupling and as a torsionally flexible, but radially stiff hub-to-rim connection for power-transmission gears, etc.

The present invention addresses the inadequacies of the prior art by providing a torsional flexible connection whose hubs have sets of equidistant protruding blades which are interdigitated to form wedge-shaped chambers housing flexible inserts loaded in compression by the transmitted torque. Each insert is comprised of two or more elements of streamlined shapes, whose dimensions in the load-transmitting (circumferential) direction are proportional to their distances from the axis of the connection, thus providing the same intensity of deformation for all the elements and assuring sharing by them the load transmitted by the connection. This allows to increase load-carrying capacity of the connection for a given size. The streamlined shapes of the elements lead to their non-linear load-deflection characteristics, and also to reduced stress concentrations. This, together with better heat transfer from several smaller elements as compared with the larger single elements, allows to increase allowable cyclic deformation amplitudes thus further increasing both rating and torsional flexibility for a given size of the connection. High radial stiffness in cases when the connection is served as a hub-to-rim connection is provided by thin-layered rubber-metal laminated inserts between the two hubs of the connection. The rubber-metal laminates are known to combine very high compression stiffness (utilized in the radial direction of the connection) and very low shear stiffness (utilized in the circumferential direction of the connection).

These and other advantages of the present invention will be readily apparent from the drawings, discussion, and claims which follow.

SUMMARY OF THE INVENTION

The present invention provides a flexible torsional connection for transmitting mechanical power designed to utilize nonlinearity and high allowable payloads and deformations of streamlined flexible elements loaded in compression. The connection includes a pair of coaxial hubs with protruding axially or radially blades, said blades of one hub located between the blades of the other hub ("interdigitated"). The side surfaces of the blades are radially directed. The resulting wedge-shaped spaces (chambers) have their widths in the circumferential direction (direction of torque transmission) proportional to a distance from the circumferential cross section in which the width is measured to the axis of the connection. At least some chambers are filled with flexible elements of a streamlined shape (e.g., roller-shaped). Since the circumferential dimension of each element in a chamber is proportional to its distance from the axis, relative compression deformations of each element associated with angular deformation of the connection caused by the transmitted torque are the same. This latter fact assures that all the elements, which are sharing the transmitted torque, have the same intensity of loading thus preventing premature failing of some elements. The streamlined shape results in higher allowable static and dynamic compression deformations of the flexible elements, thus they can be made smaller for the same desired angular deformation of the connection. The smaller size requires smaller angular dimension of the chamber, thus more chambers can be incorporated into the connection. The smaller size of the elements allows also for a better heat transfer to the hubs (if elastomeric elements are used), thus resulting in better accommodation of high dynamic loads and misalignments. Plurality of the elements in one chamber, together with a larger number of chambers and better heat transfer results in a much smaller connection for given static and dynamic torques to be transmitted.

If the connection is used for connecting the hub and the rim of a power transmission device such as a gear or a pulley, then the flexible torsional connection via streamlined elements (having a specified torsional compliance but a relatively low radial stiffness) is supplemented by radially stiff rubber-metal laminated elements having a non-significant torsional stiffness. These laminated elements are connecting the two parts of the power transmission system (two hubs, or a hub and a rim), which are already connected by the torque-transmitting flexible elements.

The streamlined flexible elements can be fabricated of various materials, such as elastomeric materials, other polymers, metal (e.g., solid, hollow, or wound from strip or wire stock rollers), etc., which have required load-deformation characteristics.

BRIEF DESCRIPTION OF THE DRAWINGS

The present invention can best be understood with reference to the following detailed description and drawings in which.

DETAILED DESCRIPTION OF THE PREFERRED EMBODIMENTS

Figure 1:
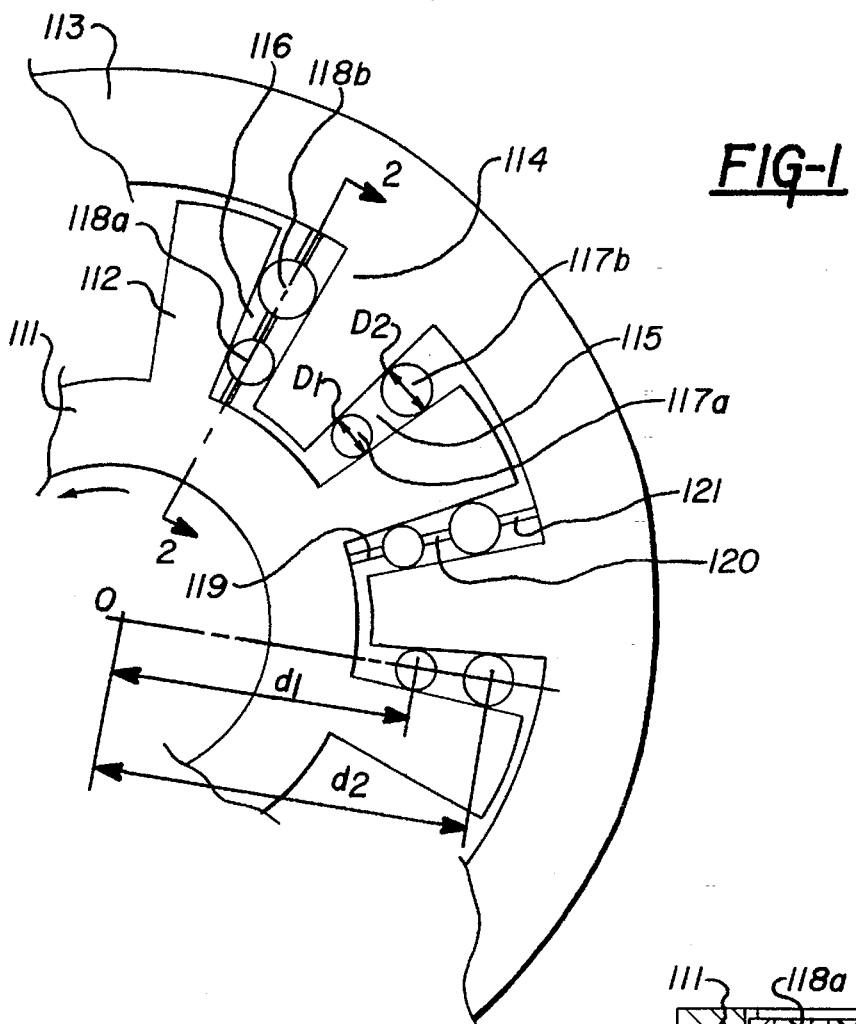
FIG. 1 is an axial direction view of one of the embodiments of the proposed invention showing general location of the basic part of the connection having flat contact surfaces and solid torque-transmitting components.

FIG. 1 illustrates the proposed torsional flexible connection. Hub 111 is attached to one of the connected parts of the power transmission system. It is equipped with protruding blades (ribs) 112 which are uniformly spaced around the circumference. Blades 112 are protruding in the radial direction from hub 111, although they can extend in the axial direction as well. Hub 113 is attached to the second of the connected parts of the power transmission system. It is equipped with protruding blades 114 which are uniformly spaced around the circumference with the same angular pitch and about the same axial width as blades 112 of hub 111. Blades 114 of hub 113 are interdigitated with blades 112 of hub 111 as it is seen in FIG. 1.

As shown in FIG. 1, hub 113 is surrounding hub 111; however, if the blades 114 are extended axially, hub 113 can be positioned closer to the axis O and thus would have a radius commensurable with the radius of hub 111.

Side surfaces of blades 111 and 113 are radial, that is, their planes if extended, would contain axis O. As a result, each wedge-shaped chamber 115 and 116 formed by interdigitated blades 112 and 114, would have its width proportional to radius of the circumference (cylinder) at which said width is measured. Chambers 115 and 116 contain elastic torque-transmitting elements 117a, 117b, and 118a, 118b, respectively, having round or elliptical shape in the radial cross section (elements of the round cross sectional shape are pictured in FIG. 1). While only two torque-transmitting elements 117, 118 are shown in each chamber 115, 116, respectively, their number can be larger depending on radial and angular dimensions of chambers 115, 116. The number of the torque-transmitting elements in torque-transmitting (115 in FIG. 1) and idle (116 in FIG. 1) chambers can be different depending on the chamber dimensions and design needs. If hub 111 is the driving one (in the direction shown by arrow in FIG. 1), there are sometimes advantages in making chambers 115 and 116 of different angular dimensions. In the design in FIG. 1, the slightly larger angular dimension is shown for elements 118a, 118b.

Since chambers 115 and 116 are formed by radial planes, dimensions (diameters D) of elastic torque-transmitting elements between their points (lines) of contact with side surfaces of the respective blades are proportional to distances d from contact points to the axis O. For the elements 117a, 117b in FIG. 1

$$d_1/D_1 = d_2/D_2;$$

a similar correlation can be written for the elements 118a, 118b.

Torque-transmitting elements 117, 118 can be inserted in the respective chambers 115, 116 with a preload, thus dimensions $D_1$, $D_2$ are not necessarily the initial (unloaded) diameters of the respective torque-transmitting elements, although a better performance of the instant torsional flexible connection will be achieved if the relative compression deformation (as percentage of their initial, unloaded, diameter) of the elements due to the initial preload is the same for all elements occupying the same chamber.

All the torque-transmitting elements occupying one chamber between the adjacent blades on two counterpart hubs represent one torque-transmitting flexible insert.

If the flexible insert consists of separate torque-transmitting elements, such as 117a, 117b in FIG. 1, their desired location is provided by the wedged shape of the chamber in which they are located (115 in FIG. 1) or by other means such as a small amount of an adhesive at the contact areas between the torque-transmitting element and the side surfaces of the blades. An alternative means of location of the torque-transmitting elements comprising an insert is shown in FIG. 1 for elements 118a, 118b. These elements have protrusions 119, 120, 121 which have much smaller cross sections than the respective elements 118a, 118b. Thus, they do not contribute noticeably to torque transmission capabilities of the torque-transmitting elements, but only provide necessary radial restraint for elements 118a, 118b. Protrusions 119, 120, 121 can be fabricated together with the elements, or can be attached to them by known joining techniques, such as gluing or welding. The protrusions can bind (integrate) the elements into an integrated flexible insert, or the individual elements with the appropriate protrusions are just contacting each other thus restraining their shifts within the chamber.

Widths of the blades, such as 112 and 114 in FIG. 1, can be different from widths of the respective hubs, such as 111 and 113 in FIG. 1.

In operation, driving hub 111 is forcing its protruding ribs 112 to compress elements 117a, 117b which transmit tangential forces to protruding ribs 114 of hub 113 or, for the reverse direction of rotation, to compress elements 118a, 118b. It is known, that static and dynamic stresses in both elastomeric and metal elements of similar shape but different (scaled) dimensions, as well as creep of elastomeric elements, depend on their relative deformation. Chambers 115 which are housing flexible inserts composed of torque-transmitting elements 117a, 117b, are of such shape that elements 117a, 117b dimensioned as described above are experiencing the same relative compression deformation. Accordingly, the elements would be characterized by, approximately, the same relative degree of creep and same rate of deterioration caused by static and dynamic stresses. This is quite different from known "spider" or "jaw" couplings, e.g., ones described in U.S. Pat. Nos. 3,837,179 and 3,638,454, in which cross sections of torque-transmitting legs of the flexible spiders located at different distances from the coupling axis are experiencing very different relative deformations. In such cases the most highly loaded segments of the torque-transmitting elements are those which are located at the farthest distance from the axis, and the segments which are closer to the axis are underloaded. The instant invention allows to fully utilize load (torque) carrying capacity of all the elements comprising the flexible inserts, thus resulting in minimization of dimensions for the torsional flexible connection. Streamlined shape of the torque-transmitting elements allows to further enhance torque rating and/or allowable deformation of the connection since it is known that the elements having variable contact areas with the loading surfaces exhibit much lower creep and have much better fatigue resistance than the elements having a permanent wide surface contact (e.g., see B. S. Lee, "Study of Shape Effects on Creep and Load-Deflection Characteristics of Elastomeric Components", PhD Thesis at Wayne State University, 1991, or M. L. Kerr, R. Schmidt, "A New Elastomeric Suspension Spring", SAE Paper 710058, 1971).

The streamlined elements (e.g., cylindrical elastomeric elements under radial loading) also demonstrate a desirable strong nonlinearity of their load-deflection characteristic which improves dynamic characteristics of the proposed torsional flexible connection in case of torsional vibrations in the power transmission system.

This nonlinearity also results in a reduced radial stiffness of the proposed torsional flexible connection at low magnitudes of the transmitted torque. Since torques which are below their rated values are transmitted during most of the operational time of typical power transmission systems, this would result in reduced loads on the shaft bearings due to inevitable misalignments of the shafts connected by the proposed torsional flexible connection if it is used as a power transmission coupling.

Figure 2:
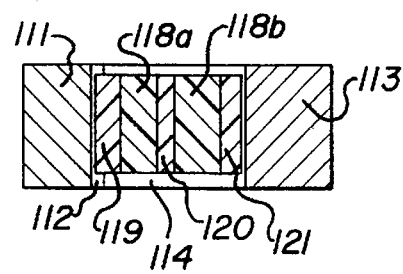
FIG. 2 is an axial cross section along line A—A of another embodiment of the proposed invention in which the torque-transmitting components are of cylindrical shape.
Figure 3:
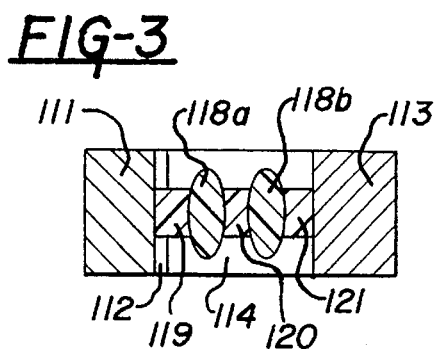
FIG. 3 is an axial cross section along line A—A of one embodiment of the proposed invention in which contact surfaces are wider than attachment parts of the connection, and the torque-transmitting components are of ellipsoidal shape.
Figure 4:
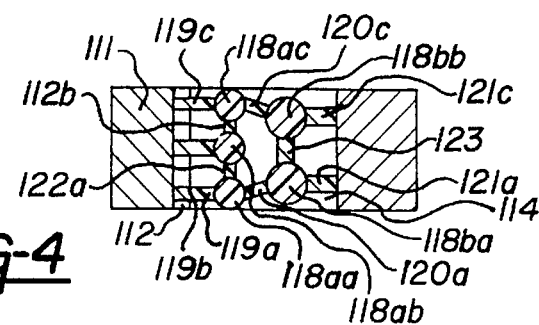
FIG. 4 is an axial cross section along line A—A of yet another embodiment of the proposed invention in which the torque-transmitting components are of spherical shape.

The torque-transmitting elements which are seen in FIG. 1 from the axial view, can be designed in different embodiments. FIGS. 2,3,4 show some embodiments as cross sections A—A of FIG. 1.

FIG. 2 shows torque-transmitting elements having the shape of round cylinders 118a, 118b extruded together with protrusions 119, 120, 121. FIG. 3 shows torque-transmitting elements having the shape of quasi-ellipsoids (or ellipsoids) 118a, 118b connected with protrusions 119, 120, 121. Obviously, other streamlined shapes such as tri-axial ellipsoids are also possible without changing the main concept of the instant invention. FIG. 4 shows the flexible insert designed as a plurality of quasi-spherical or spherical torque-transmitting elements 118aa, 118ab, 118ac, 118ba, 119bb with protrusions 119a, 119b, 119c, 120a, 120b, 121a, 121b. All torque-transmitting elements 118ca and 118b in FIG. 4 are connected by no-load carrying connections 122ab,b and 423, thus integrating all flexible inserts and allowing to simplify initial assembly as well as change of flexible inserts in the field conditions.

The torque-transmitting elements pictured in FIGS. 1,2, 3,4 are of solid structure thus making elastomeric (rubber-like) materials the most suited for construction of these elements. Hollow torque-transmitting elements of two alternative designs 517a,b and 518a,b in FIG. 5 can be made of a rigid material such as metal. Elements 517a,b have a spiral design which is associated with high damping induced by friction between the layers of the spirals. Elements 518a,b have damping determined mostly by internal damping of their material and thus call for use of a high damping material (e.g., magnesium, nickel-titanium, fiber-reinforced composite, etc.), or have to be used in cases when low damping is acceptable. Hollow cylinders 518a,b can also be designed as helical coil springs, e.g. as per U.S. Pat. No. 4,358,215 granted to this applicant.

Figure 5:
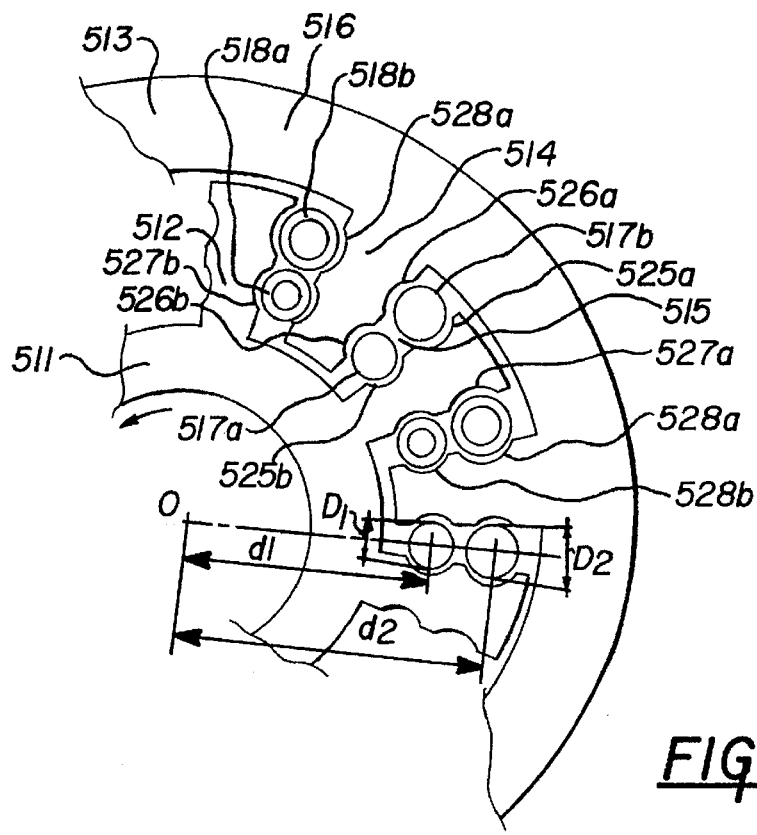
FIG. 5 is an axial direction view on another embodiment of the proposed invention having tubular torque-transmitting components.

Side surfaces of blades 512 and 514 in FIG. 5 have smooth recesses 525a,b and 526a, b in the areas of contact with torque-transmitting elements 517a, b, and smooth recesses 527a, b and 528a, b in the areas of contact with torque-transmitting elements 518a, b. These recesses serve a dual role. They modify contact stresses/deformations of torque-transmitting elements 517, 518 thus enhancing their load-transmitting capabilities and stiffnesses, and also retain the torque-transmitting elements in their proper places. The recessed shapes of blades 512, 514 do not introduce additional manufacturing complications if hubs 511, 513 are produced by extrusion. For clarity of the drawing, clearances are shown in FIG. 5 between actually contacting surfaces of blades 512, 514 and torque-transmitting elements 517, 518.

Figure 6:
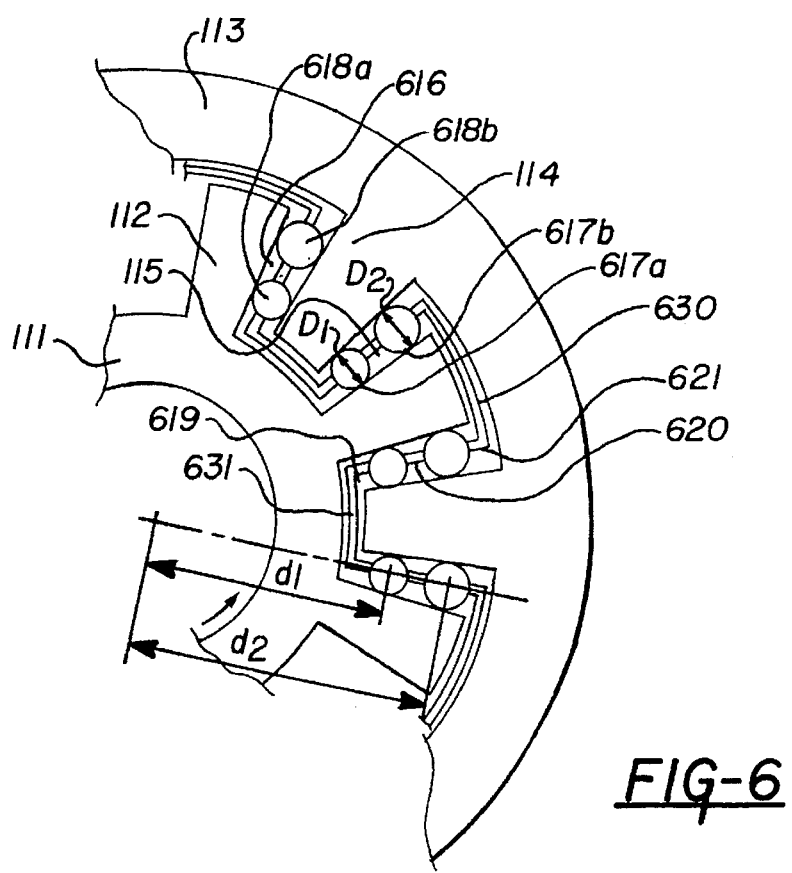
FIG. 6 is an axial direction view of another embodiment of the proposed invention wherein the torque-transmitting components are integrated by auxiliary protrusions not contributing significantly to transmitting torque.

FIG. 6 shows an embodiment of instant invention in which all torque-transmitting elements are integrated by protrusions 619, 620, 621 and by connections 630, 631. Such a design simplifies assembly/disassembly of the coupling, especially in the field conditions.

It is obvious, that all or only some chambers created by interaction of the blades protruding from the connected hubs can be filled with the flexible inserts.

Figure 7:
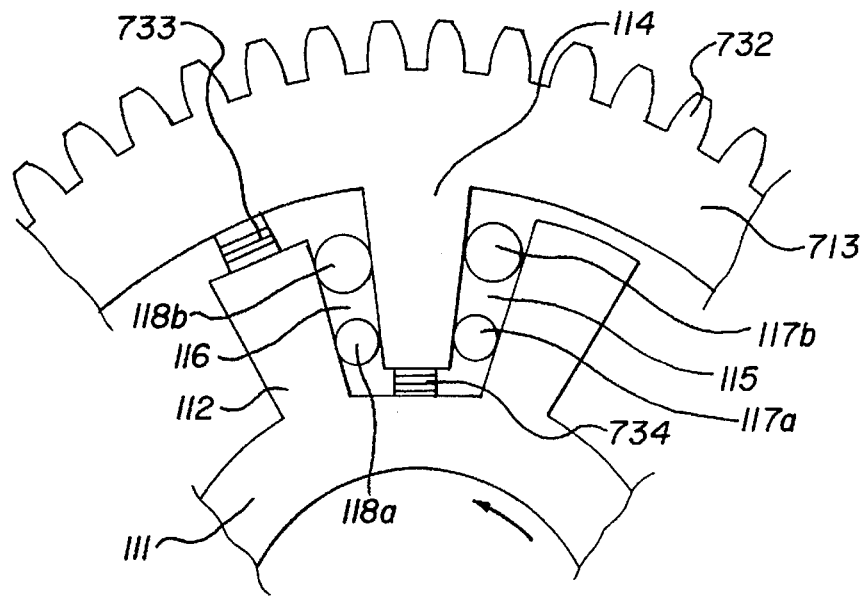
FIG. 7 is an axial direction view of yet another embodiment of the proposed invention equipped with laminated metal-elastomeric inserts enhancing radial stiffness of the connection without significantly influencing its torsional stiffness.

FIG. 7 shows application of the instant invention to provide a flexible torsional connection for a gear. Other applications of this design can be envisioned for a pulley, for a sprocket, etc. In all such cases, while a specified torsional compliance is desirable, radial deformations between the rim and the hub must be restricted.

The embodiment in FIG. 7 has gear rim 732 machined on (or attached to) hub 713. The torsional flexible correction between hub 111 and rim 732 (or between blades 112 and 114) is provided by inserts 117 and 118 composed of torque-transmitting elements 117a, b and 118a, b, respectively and located in chambers 115 and 116, respectively. Metal-elastomer laminates 733 are installed with a small clearance or with a preload between the outermost surfaces of blades 112 and the inner surface of hub 113. Metal-elastomer laminates 734 are installed with a small clearance or with a preload between the innermost surfaces of blades 114 and the outer surface of hub 111.

Figure 8:
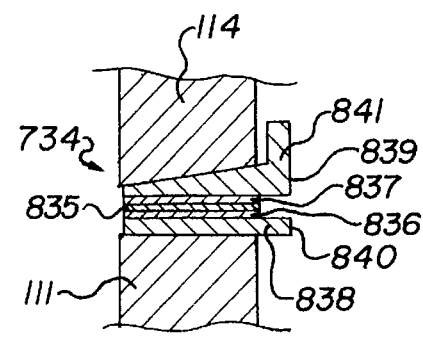
FIG. 8 is a cross section along line B—B of a laminated metal-elastomeric insert showing details of its design.

One embodiment of metal-elastomer laminate 734 in FIG. 7 is shown in FIG. 8 which represents a cross sectional view B—B of FIG. 7.

Laminates 734 consist of alternating, preferably thin, layers of elastomeric (rubber-like) material 835 and rigid material (metal, rigid plastic, etc.) 836 secured between rigid covers 837 and 838. Embodiment in FIG. 8 has contacting surfaces of blade 114 and cover 837 made tapered at the same (but opposite) small ("self-locking") angle relative to the axis of the torsional flexible connection, and ends 839 and 840 of covers 837 and 838 protruding for the same length sideways. Cover 847 has a hook-like attachment 841.

It is known (e.g., see E. Rivin, "Ultra-Thin-Layered Rubber-Metal Laminates for Limited Travel Bearings", Tribology International, 1983, Vol. 16, No. 1, pp. 17–25) that thin-layered metal-elastomer laminates combine very high stiffness in compression with low stiffness in shear. The compression stiffness can be further enhanced by the assembly preload, and compression- to-shear stiffness ratio can reach 100–5000.

Thus, connecting two principal parts 111 and 113 by laminates 732 and 733 as shown in FIG. 7 would provide high radial stiffness of the torsional flexible connection (thus restraining the radial deformations) without significantly increasing its torsional stiffness. By applying pressure simultaneously to outstanding ends 839 and 840 of covers 837 and 838 in FIG. 8, and using the mechanical advantage of the tapered (wedge-like) connection between cover 837 and blade 114, compression preload can be activated without shear deformation of the laminate. Flat portion 841 of cover 837 may be useful for application of pressure during assembly.

Only one set of laminates—external set 733 or internal set 734 in FIG. 7 can be used for the radial stiffening of the torsional flexible connection, or both sets can be used simultaneously in the same design. The preferred minimal number of laminates in each set 733 and 734 required for a stable operation of the torsional flexible connection is three, with the laminates being preferably uniformly distributed in the circumferential direction, although a larger numbers of the laminates can be used.

Figure 9:
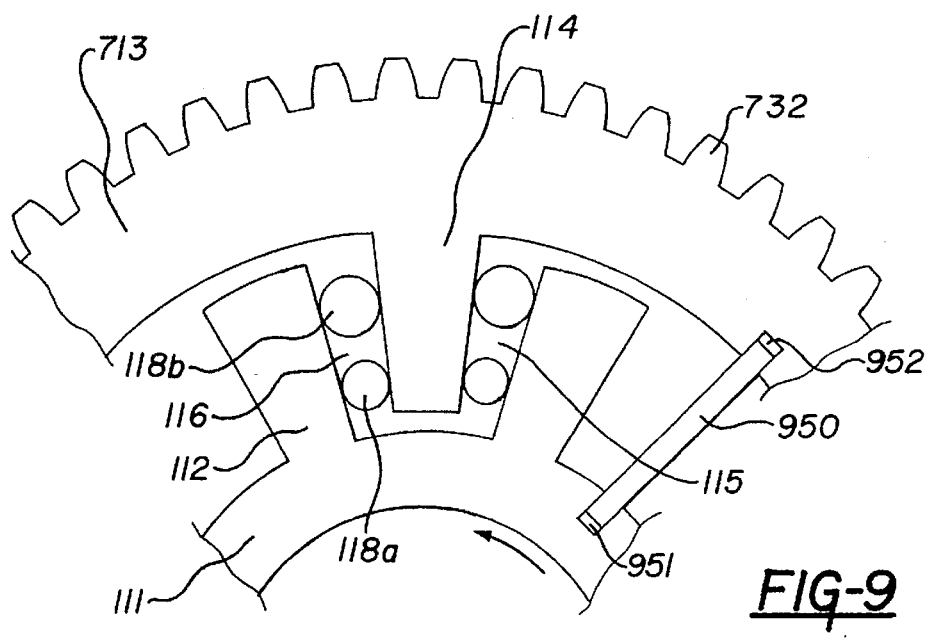
FIG. 9 is an axial direction view of another embodiment of the proposed invention equipped with slender radially-restraining elements made of a rigid material and enhancing radial stiffness of the connection without significantly influencing its torsional stiffness.

FIG. 9 shows another embodiment of the flexible torsional connection for a gear, pulley, sprocket, etc. Gear rim 732 integral with hub 713 has a torsionally flexible connection with hub 111 by inserts 117 and 118 located, respectively, in chambers 115 and 116. The radial restraining action is provided by slender elements—strips or bars 950 located in some of the chambers. The strips/bars are made of rigid material such as metals, composites, plastics. Attachment of strip/bar 950 in FIG. 9 to hubs 111 and 713 is via slots 951, 952 in hubs 111, 713, respectively. The strip/bar can be fixed by known means, such as adhesive, or allowed to slide in one of the slots. In the latter case, if there are several strips/bars 950 around the circumference, the sliding will occur only to accommodate large torsional displacements between hubs 111, 713. Concentricity of the hubs will be always maintained, thus representing the radially restraining action.

It is readily apparent that the components of the torsionally flexible connection disclosed herein may take a variety of configurations. Thus, the embodiments and exemplifications shown and described herein are meant for illustrative purposes only and are not intended to limit the scope of the present invention, the true scope of which is limited solely by the claims appended hereto.

What is claimed is:

1. A torsional flexible connection for mechanical power transmission comprising:

an inner hub and an outer hub disposed in a coaxial relationship about a common axis of rotation, each hub including a plurality of wedge shaped blades projecting therefrom, each of said blades being defined by a pair of spaced apart sides which are disposed along radii of said connection passing through said axis of rotation, said blades of said inner hub being disposed in an interdigitating, spaced apart relationship with the blades of the outer hub so that a plurality of wedge shaped chambers are defined therebetween; and at least two of said chambers including a torque transmitting, flexible insert disposed therein, said flexible insert including at least a first and a second torque transmitting element, disposed in a spaced apart relationship, and lying along a common radius of said connection passing through said axis of rotation, said first element being spaced from said axis by a distance $d_1$ and having a diameter $D_1$, said second element being spaced from said axis by a distance $d_2$ and having a diameter $D_2$, said elements being configured so that $d_1/D_1=d_2/D_2$; whereby said first and second elements experience the same degree of relative compressional deformation when torque is transmitted between said inner hub and said outer hub.

2. A torsional flexible connection as in claim 1, wherein said first and second torque transmitting elements are joined together by a protrusion extending therebetween.

3. A torsional flexible connection as in claim 2, wherein said protrusion is formed integrally with said first and second torque transmitting elements.

4. A torsional flexible connection as in claim 1, further including a multi-layered, laminated body comprising alternating layers of an elastomeric material and a rigid material, said laminated body having a high stiffness when compressed in a direction perpendicular to said layers and a low degree of stiffness when sheared in a direction parallel to said layers, said laminated body being disposed between said inner and outer hubs, at a location outside of said chambers, and being oriented so that a radius of said connection passes therethrough in a direction perpendicular to said alternating layers.

5. A torsional flexible connection as in claim 1, wherein said sides of said blades each include a first concave depression therein for engaging said first element and a second concave depression therein for engaging said second element.

6. A torsional flexible connection as in claim 1, wherein said sides of said blades are planar.

7. Torsional flexible connection as in claim 1 wherein said torque-transmitting elements are of a cylindrical shape.

8. Torsional flexible connection as in claim 1 wherein said torque-transmitting elements are of a spherical shape.

9. Torsional flexible connection as in claim 1 wherein said torque-transmitting elements are of an ellipsoidal shape.

10. Torsional flexible connection as in claim 1 wherein said torque-transmitting elements are of a tubular shape.

11. Torsional flexible connection as in claim 1 wherein said torque transmitting elements are made of an elastomeric material.

12. Torsional flexible connection as in claim 1 wherein said torque-transmitting elements are made of a rigid material.

* * * * *